United States Patent [19]
Goris

[11] Patent Number: 5,970,182
[45] Date of Patent: Oct. 19, 1999

[54] REGISTRATION PROCESS FOR MYOCARDIAL IMAGES

[75] Inventor: Michael L. Goris, Sunnyvale, Calif.

[73] Assignee: Focus Imaging, S. A., France

[21] Appl. No.: 08/558,324

[22] Filed: Nov. 15, 1995

[51] Int. Cl.$^6$ .......................... G06F 15/316; G06K 9/00; G06K 9/34; G06K 9/40
[52] U.S. Cl. .................. 382/278; 382/171; 382/266; 382/284; 382/294; 382/128
[58] Field of Search ...................... 382/124, 128, 382/132, 278, 276, 131, 294, 282, 284, 287, 291, 169, 171, 199, 266, 203, 271; 128/630, 653.2; 395/133, 136

[56] References Cited

U.S. PATENT DOCUMENTS

| | | | |
|---|---|---|---|
| 5,072,384 | 12/1991 | Doi et al. | 382/132 |
| 5,151,856 | 9/1992 | Halmann et al. | 128/695 R |
| 5,360,006 | 11/1994 | Geiser, et al. | 382/131 |
| 5,431,161 | 7/1995 | Ryals et al. | 382/131 |
| 5,568,384 | 10/1996 | Robb et al. | 395/794 |

OTHER PUBLICATIONS

Slomka, et al., Automated Alignment and Sizing of Myocardial Stress and Rest Scans to Three–Dimensional Normal templates Using an Image, pp. 1115–1122, Journal of Nuclear Medicine, vol. 36, No. 6, Jun. 1995.

Tamaki, et al., Value of Rest–Stress Myocardial Positron Tomography Using Nitrogen–13 Ammonia for the Preoperative Prediction of Reversible Asynergy, pp. 1302–1310, Journal of Nuclear Medicine, vol. 30, No. 8, Aug. 1989.

Tamaki, et al., Myocardial Tomography Using Technetium–99m–Tetrofosmin to Evaluate Coronary Artery Disease, pp. 594–600, Journal of Nuclear Medicine, vol. 34, No. 4, Apr. 1994.

Van Train, et al., Quantitative Analysis of Stress Thallium–201 Myocardial Scintigrams: A Multicenter Trial, pp. 17–25, Journal of Nuclear Medicine, vol. 27, No. 1, Jan. 1986.

Van Train, et al., Quantitative Analysis of Stress Thallium–201 Myocardial Scintigrams: A Multicenter Trial, pp. 1168–1179, Journal of Nuclear Medicine, vol. 31, No. 7, Jul. 1990.

Van Train, et al., Multicenter Trial Validation for Quantitative Analysis of Same–Day Rest–Stress Technetium–99m–Sestamibi Myocardial Tomograms, pp. 609–618, Journal of Nuclear Medicine, vol. 35, No. 4, Apr. 1994.

Diamond, et al., Analysis of Probability as an Aid in the Clinical Diagnosis of Coronary–Artery Disease, pp. 1350–1358, The New England Journal of Medicine, vol. 300, No. 24, Jun. 14, 1979.

Diamond, et al., A Model for Assessing the Sensitivity and Specificity of Tests Subject to Selection Bias, pp. 343–354, J Chron Dis vol. 39, No. 4, 1986.

Garcia, et al., Space/Time Quantitation of Thallium–201 Myocardial Scintigraphy, pp. 309–317, Journal of Nuclear Medicine, vol. 22, No. 4, 1981.

(List continued on next page.)

*Primary Examiner*—Bipin H. Shalwala
*Attorney, Agent, or Firm*—Trial & Technology Law Group

[57] ABSTRACT

Registration of organ images, such as myocardial images obtained by myocardial perfusion scintigraphy, is performed by an elastic transformation which includes a rigid transformation, a global affine transformation, and local transformations. The elastic transformation eliminates normal morphological variances such as variances in orientation, size and shape, so that the remaining differences represent important functional differences. The method may be used to register a patient's organ against a template obtained by averaging organ images from many patients. For scintigraphic images the boundary of the organ is determined by a "segmentation" procedure involving the analysis of spatial derivatives of the count density. After the elastic transformations of the surface of the organ, the scintigraphic count densities are redistributed. The method decreases the effects of operator variability and increases the reliability of diagnoses of organ irregularities.

7 Claims, 7 Drawing Sheets

OTHER PUBLICATIONS

Garcia, et al., Quantification of Rotational Thallium–201 Myocardial Tomography, pp. 17–26, Journal of Nuclear Medicine, vol. 26, No. 1, Jan. 1985.

Germano, et al., Automatic Reorientation of Three–Dimensional, Transaxial Myocardial Perfusion SPECT Images, pp. 1107–1114, Journal of Nuclear Medicine, vol. 36, Jun. 1995

Goris, et al., A Principled Approach to the "Circumferential" Method for Tallium Myocardial Perfusion Scintigraphy Quantitation, pp. 103–112, Stanford University School of Medicine, Stanford CA.

Goris, et al., Validation of Diagnostic Procedures on Stratified Populations: Application on the Quantitation of Thallium Myocardial Perfusion Scintigraphy, pp. 11–15, American Journal of Physiologic Imaging 4, (1989).

Goris, et al., Interrogation and Display of Single Photon Emission Tomography Data as Inherently Volume Data, pp. 168–180, American Journal of Physiologic Imaging 1, (1986).

Goris, et al., Two–Dimensional Mapping of Three–Dimensional SPECT Data: A Preliminary Step to the Quantitation of Thallium Myocardial Perfusion Single Photon Emission Tomography, pp. 176–180, American Journal of Physiologic Imaging 2, (1987).

Go, et al., A Prospective Comparison of Rubidium–82 PET and Thallium–201 SPECT Myocardial Perfusion Imaging Utilizing a Single Dipyridamole Stress in the Diagnosis of Coronary Artery Disease, pp. 1899–1905, Journal of Nuclear Medicine, vol. 31, No. 12, Dec. 1990.

Maddahi, et al., Quantitative Single Photon Emission Computed Thallium–201 Tomography for Detection and Localization of Coronary Artery Disease: Optimization and Prospective Validation of a New Technique, pp. 1689–1699, JACC vol. 14, No. 7, Dec. 1989.

Abdulmassih, et al., Effect of Exercise Level on the Ability of Thallium–201 Tomographic Imaging in Detecting Coronary Artery Disease: Analysis of 461 Patients, pp. 1477–1486, JACC vol. 14, No. 6, Nov. 15, 1989.

Mahmarian, et al., Quantitative Exercise Thallium–201 Single Photon Emission Computed Tomography for the Enhanced Diagnosis of Ischemic Heart Disease, pp. 318–329, JACC vol. 15, No. 2, Feb. 1990.

DePasquale, et al., Quantitative Rotational Thallium–201 Tomography for Identifying and Localizing Coronary Artery Disease, pp. 316–327, Diagnostic Methods—Nuclear Cardiology, vol. 77, No. 2 Feb. 1988.

Vogel, Quantitative Aspects of Myocardial Perfusion Imaging, pp. 146–156, Seminars in Nuclear Medicine, vol. X, No. 2, Apr., 1980.

Tamaki, et al., Stress Thallium–201 Transaxial Emission Computed Tomography: Quantitative Versus Qualitative Analysis for Evaluation of Coronary Artery Disease, pp. 1213–1221, JACC vol. 4, No. 6, Dec. 1994.

Goris, et al., Automatic Registration of Myocardial Perfusion Studies Using a Potential Based Rigid Transformation, pp. 1–8, Goris, Apr. 18, 1995.

Besl, et al., A Method for Registration of 3–D Shapes, pp. 239–256, IEEE Transactions on Pattern Analysis and Machine Intelligence, vol. 14, No. 2, Feb. 1992.

Feldmar, et al., Rigid, Affine and Locally Affine Registration of Free–Form Surfaces, pp. 1–36, Inria Sophia–Antipolis.

Danielsson, Euclidean Distance Mapping, pp. 227–248, Computer Graphics and Image Processing, 14, (1980).

Diamond, et al., Application of Conditional Probability Analysis to the Clinical Diagnosis of Coronary Artery Disease, pp. 1210–1221, J. Clin. Invest., vol. 65, May 1980.

Stewart, et al., Comparison of Rubidium–82 Positron Emission Tomography and Thallium–201 SPECT Imaging for Detection of Coronary Artery Disease, pp. 1303–1310, The American Journal of Cardiology, vol. 57, No. 16, Jun. 15, 1991.

Train, et al. Improved Quantitation of Stress/Redistribution TL–201 Scintigrams and Evaluation of Normal Limits, pp. 311–314, IEEE Computers in Cardiology, 1982.

Gonzalez et al "Digital Image Processing," pp. 416–421, Jul. 1992

REGISTRATION PROCESS FOR MYOCARDIAL IMAGES

BACKGROUND OF THE INVENTION

1. Field of the Invention

The present invention relates to myocardial imaging, and in particular to myocardial image registration, and more particularly to myocardial image registration using non-rigid transformations such as a global affine transformation.

2. Background of the Invention

Narrowing of the vessels which feed the muscle of the heart can lead to heart attacks, a condition in which the heart muscle, deprived of oxygen and nutrients "dies". One of the methods to check if a patient has narrowing of those vessels is a myocardial perfusion scintigraphy. This is a test in which the patient is injected with a tracer (or dye) that goes to different regions of the heart muscle in proportion to the blood flow that goes to those regions. Radioactive emissions from the tracer are monitored and by triangulation the concentration of the tracer in various regions is determined. The test is performed in two parts. First the tracer is injected while the patient is resting and a myocardial image (a "rest image") is taken. Then, a second tracer injection is made while the patient is exercising, for instance walking on a treadmill for approximately 20 minutes, and another myocardial image (a "stress image") is taken. Each myocardial image is a two-dimensional picture of the heart which shows the distribution of the blood flow to the various parts of the heart muscle.

For healthy hearts this blood distribution is "normal" (i.e., similar to a template image obtained from averaging images from a large number of healthy hearts) for both the resting and stress images. In cases where there is a narrowing of one of the blood vessels, the distribution is normal after the resting injection but abnormal after the exercise injection. These "transient defects" are detected by a comparison of the stress and rest images. In other cases, such as after a heart attack, because some muscle tissue has died, or if the narrowing of blood vessels is severe, both the resting and stress images will be abnormal. These "fixed defects" are therefore detected by comparison of the rest image and the template image.

Comparisons of the stress image and the template, or the stress and rest images, are not easily made visually. To improve the accuracy of the test, quantitative comparison have been proposed. However, this is problematic due to the large natural variation in the orientation, size and shape of different human hearts, even between "normal" hearts. This difficulty has been overcome to some extent by strategies to eliminate the effects of variations in orientation, size and shape, but most of these strategies lose important information in the process of the simplification of the image data.

Myocardial perfusion scintigraphies are the third most frequently performed nuclear medicine procedure (after bone and lung) in the United States. Their role in the patient management is crucial, since they are used to select for intervention (coronary arteriography) those patients suspected of having coronary artery disease, and in some cases to determine the significance of known coronary lesions. At present the sensitivity and specificity of the method are 52% to 99% and 55% to 93%, respectively. As shown in Table 1, the variation is due in part to interpretation differences (e.g. the inclusion of transient defects in the interpretation). But apart from fundamental methodological limitations and interpretation differences, the goal of the present invention is to decrease the normal variability using an automated registration method. A small increase in the sensitivity and specificity will represent a large number of patients in whom the correct diagnosis will be made.

The analysis of scintigraphic myocardial perfusion images is generally based on some form of a polar transformation where the myocardial densities are sampled along evenly spaced radii projecting from an origin in the center of the cavity. For instance, in a method termed "radial sampling" (Goris 87) the three-dimensional images are sampled along rays or radii originating in the center of the left ventricular cavity. Each radius is characterized by a longitudinal angle "a" and latitudinal angle "b". The origin of "b" is the apex of the myocardium, and "b" goes in 32 steps from 0 to 135 degrees (generally the myocardium does not extend beyond 135 degrees). The origin of "a" is the middle of the lateral wall, and "a" varies from 0 to 360 degrees. The maximum count rate density along the radius R(a,b) is stored in the 64×64 matrix B at the location (K,L) where K and L are defined as:

$K = (32b/135) \cos(a) - 32$ $L = (32b/135) \sin(a) - 32$

Figure 1:
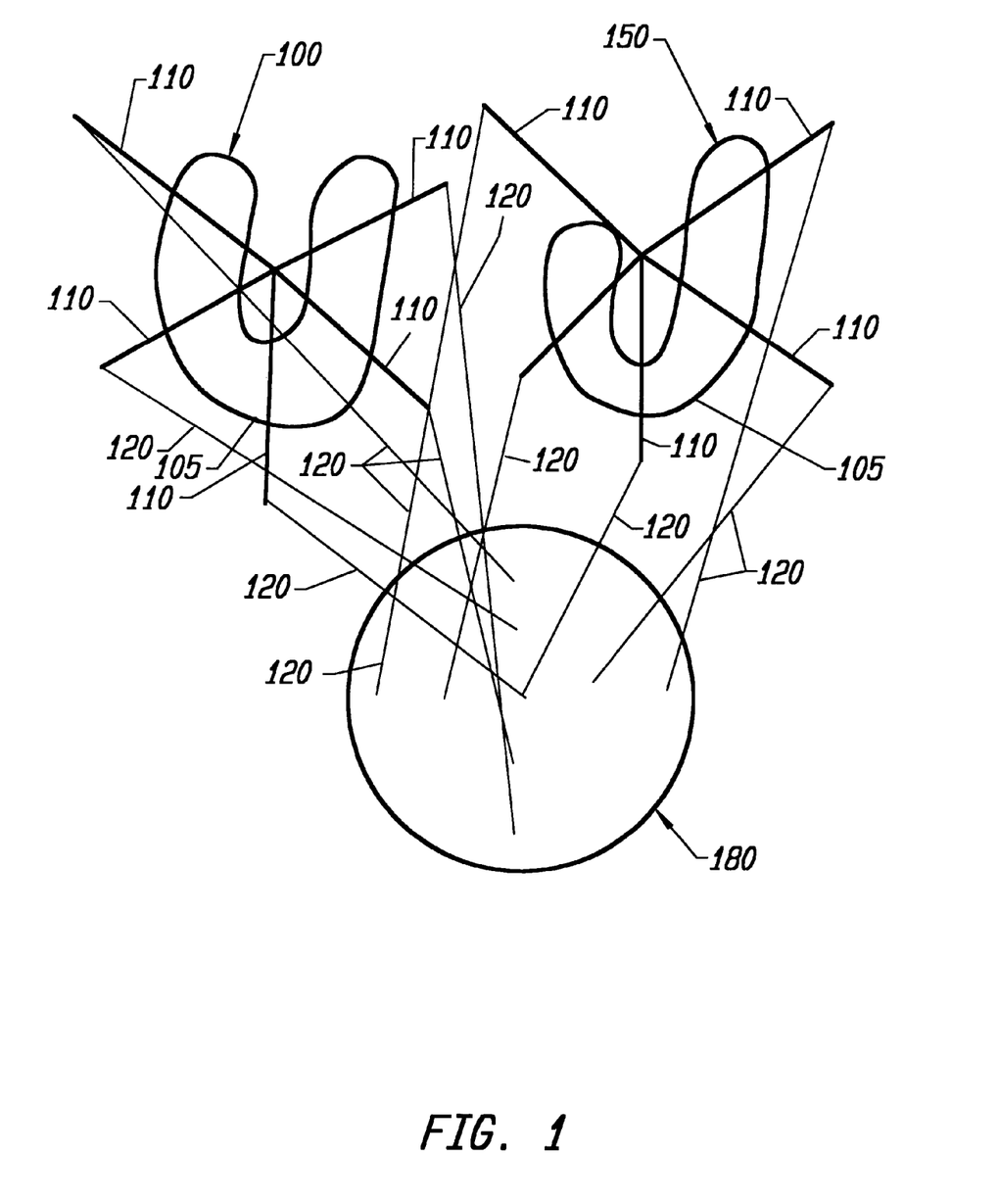
FIG. 1 depicts two cross sections of a myocardium and a bull's eye map, and illustrates the mapping of points on myocardium to the bull's eye map.
Figure 2A:
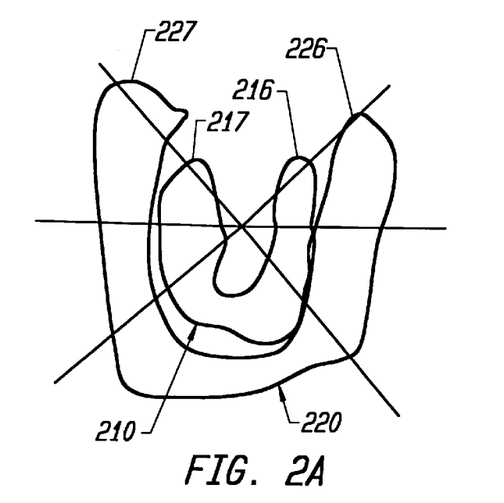
FIG. 2A shows to myocardia of different sizes.
Figure 2B:
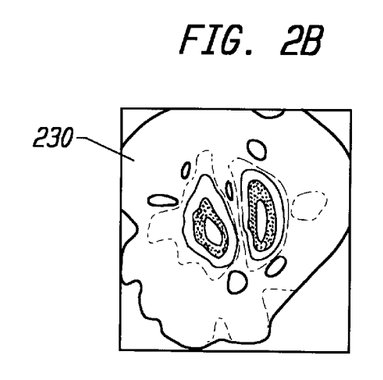
FIGS. 2B and 2C show cross sections of images of the two myocardia.
Figure 2C:
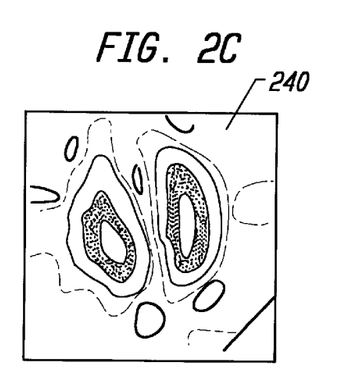
Figure 2D:
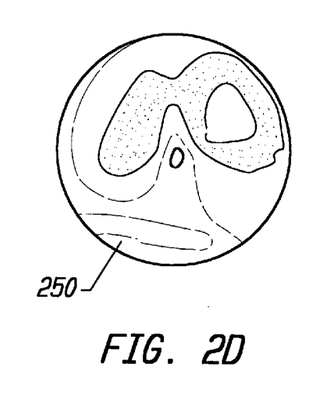
FIGS. 2D and 2E show bull's eye maps of the two images of FIGS. 2B and 2C, respectively.
Figure 2E:
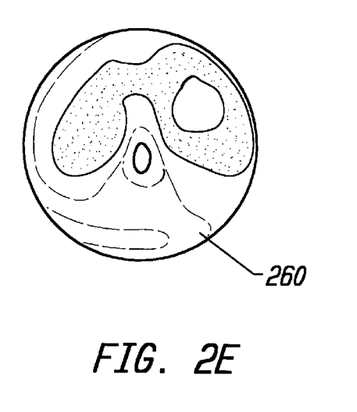

The matrix B is therefore a planar image in which the central points represent locations near the apex of the myocardium, and the peripheral points represent the locations near the base of the myocardium. FIG. 1 displays the central horizontal 100 and vertical 150 long axis slices of a myocardium. The long axis of this myocardium is oriented from top to bottom in FIG. 1, with the apex 105 pointing towards the bottom of the page. On each slice 100 and 150 a number of exemplary search rays 110 are shown, and broken lines 120 lead from the end of each search ray 110 to its location on a bull's eye map 180. As shown in FIG. 1, the anterior wall is mapped on top of the image, the inferior wall is mapped to the bottom of the image, and the septum is mapped to the left-hand side of the image. This matrix B is comparable to the bull's eye maps described in the literature (Garcia 81, 85, Maddahi 89, Mahmarian 90, Van Train 82, 86, 90, Vogel 80), except for the fact that the distance from the center represents a latitude "b" in three dimensions, rather than a short axis plane position: The bull's eye map approach interrogates the volume as if it were a set of planes (Goris 86).

Since a polar transform only measures angles, all morphological attributes of the myocardium are reduced to angular coordinates. This provides for a normalization of size and shape (Goris 82) and facilitates the comparison of target cases to a population of normal cases, and the comparison of target cases. This is illustrated by FIG. 2 which shows the myocardium 210 and 220 from two patients. Although the myocardia 210 and 220 differ considerably in size, as reflected in the count density cross-sections 230 and 240 shown in FIGS. 2B and 2C, the corresponding polar maps 250 and 260 of FIGS. 2D and 2E, respectively, are very similar. This is also true for the polar component in bull's eye mapping, in which the third axis is divided in a set number of parallel "thick slices" between the apex and the base of the heart.

Figure 3A:
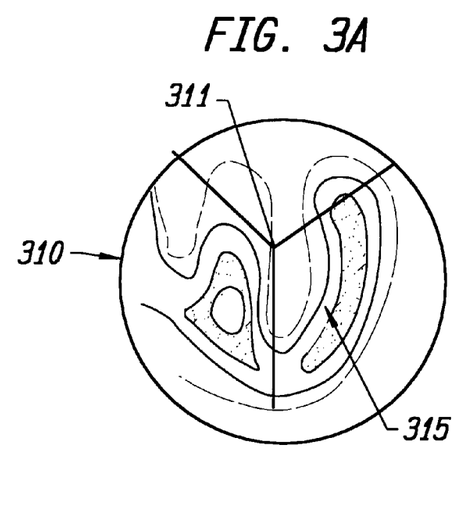
FIGS. 3A and 3B show cross sections of the same myocardium with the origin of the coordinate system at different locations.
Figure 3B:
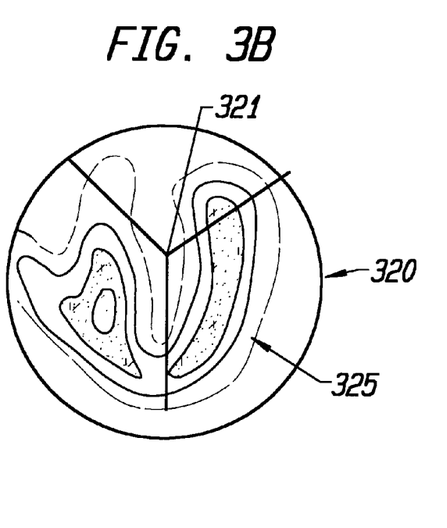
Figure 3C:
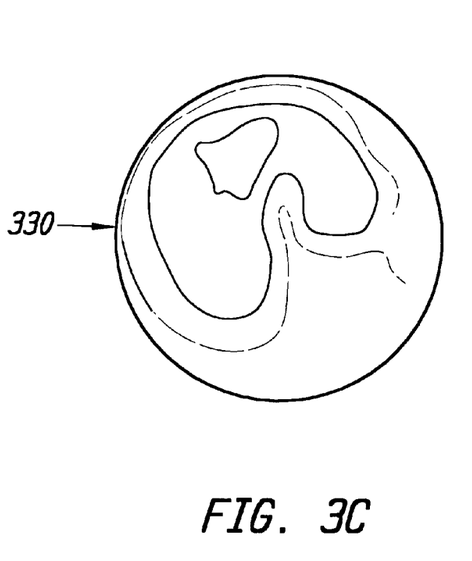
FIGS. 3C and 3D show the resulting bull's eye maps from FIGS. 3A and 3B, respectively.
Figure 3D:
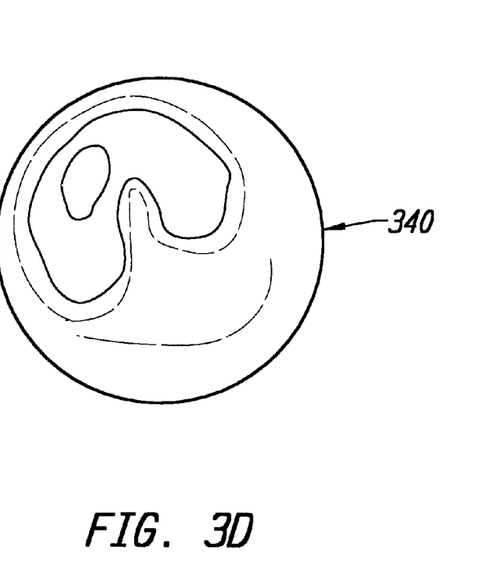

There are four significant limitations inherent in polar transformations, of which two are alignment limitations (Goris 82); one is due to the sampling direction and one is due to the inherent assumption that there is no relevant morphology except angular morphology. One alignment issue associated with such polar maps is the placement of the origin of the rays, as illustrated by FIGS. 3A–3D. FIGS. 3A and 3B display the same myocardial image, but in FIG. 3A the origin 311 of the rays is displaced slightly to the left relative to the origin 321 of the rays in FIG. 3B. The resulting polar maps 330 and 340 of FIGS. 3C and 3D, respectively, clearly differ considerably due to this displacement of the origin. The placement of the origin is important since structures closer to the origin are relatively oversampled. Therefore if the origin is moved towards a perfusion defect, that perfusion defect will appear larger.

Figure 4A:
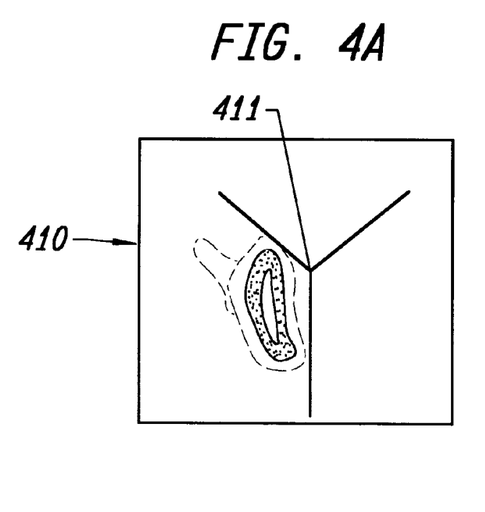
FIGS. 4A and 4B show cross sections of the same myocardium with the zero angle of the latitude displaced.
Figure 4B:
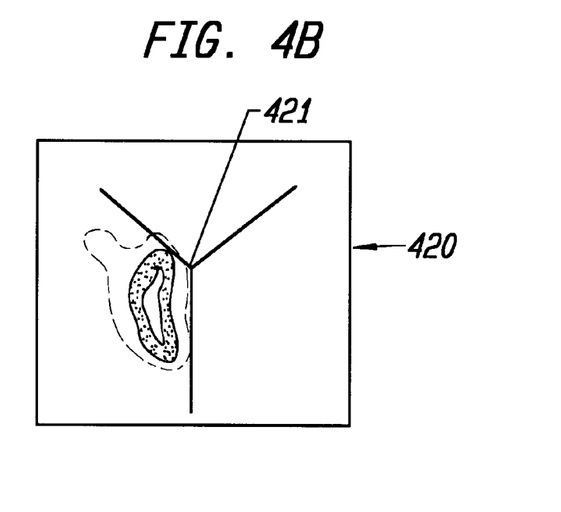
Figure 4C:
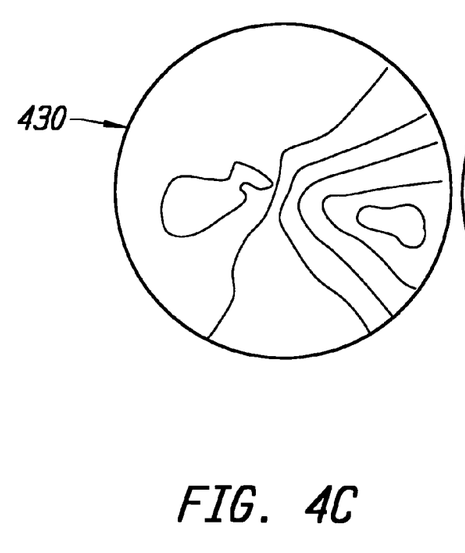
FIGS. 4C and 4D show the resulting bull's eye maps from FIGS. 4A and 4B, respectively.
Figure 4D:
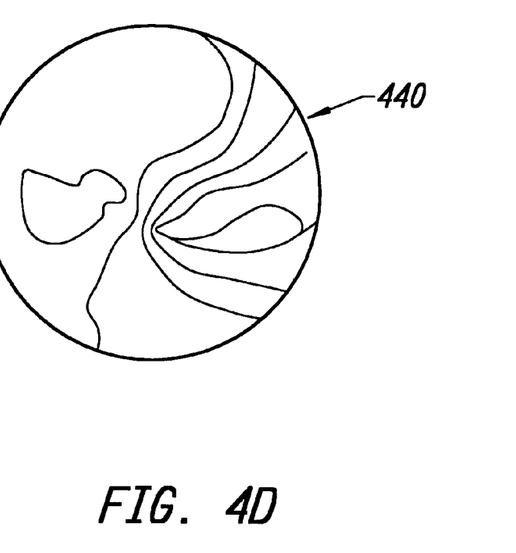

Another alignment issue associated with such polar maps is the orientation of the poles of the polar coordinate system, as illustrated by FIGS. 4A–4D. FIGS. 4A and 4B display the same myocardial image, but in FIG. 4A the myocardium is rotated clockwise slightly relative to FIG. 4B. The resulting polar maps 430 and 440 of FIGS. 4C and 4D, respectively, clearly differ considerably due to this rotation, illustrating that if the zero angle is misplaced identical distributions will appear different from each other.

Figure 5:
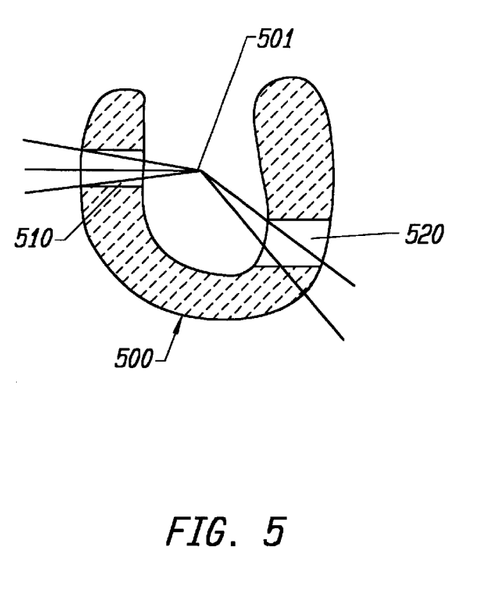
FIG. 5 illustrates how the orientation and latitudinal angles of two defects in a myocardium affects the sampling of the defects.

Another problem with such radial mapping methods is that if the lesion is relatively small and not well aligned in relation to the sampling ray direction, the lesion may be underdetected. For instance, as shown in FIG. 5 the defect 510 on the left side of the myocardium 500 is somewhat smaller than the defect 520 on the right side of the myocardium 500. The longitudinal axis of the lefthand defect 510 is well-aligned with the rays coming from the origin 501 so this defect will be clearly represented in a polar map. However, the longitudinal axis of the right-hand defect 520 is not well-aligned with the rays coming from the origin 501 so samples along these rays will include healthy myocardium tissue or will exclude defective myocardium tissue, and this defect will not be clearly represented in a polar map. This sampling direction problem is only partially overcome by modifying the method so that the rays are normal vectors to the myocardium surface, since the direction of the defect across the myocardium is variable and may not be parallel to such normal vectors.

Figure 6:
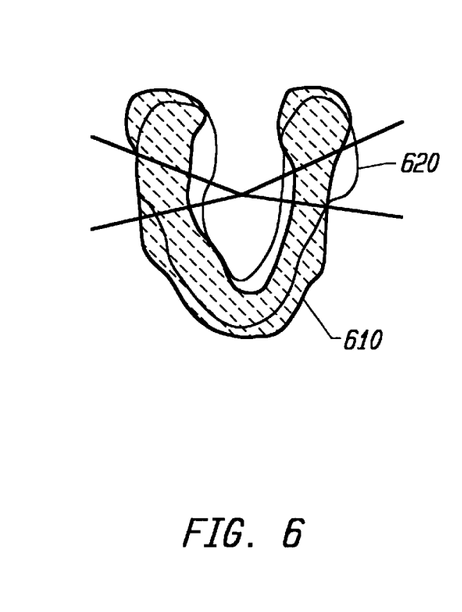
FIG. 6 illustrates how the angles at which the base thickening ends differs in two well-aligned hearts.
Figure 7:
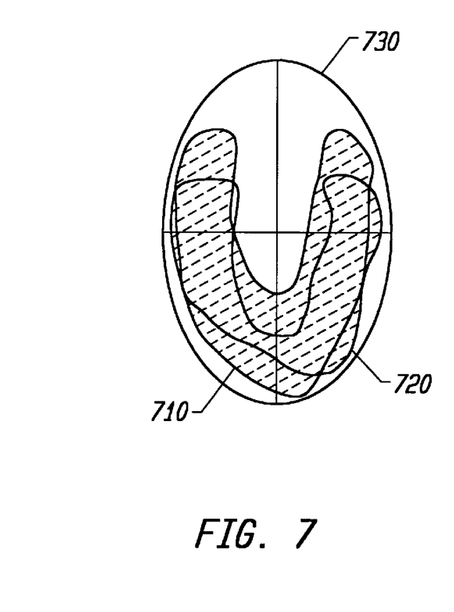
FIG. 7 shows how two myocardium which share a common best-fitting ellispoid are not necessarily well-aligned.

Another problem with such radial mapping methods is that the proportion of different parts of the myocardium are not necessarily fixed. For instance, the base of the heart with the papillary muscles may be more or less prominent. As shown with the two superimposed myocardia 610 and 620 or FIG. 6, because there may be relevant non-angular morphologies, equal angular coordinates do therefore not necessarily map into identical myocardial structures. It may be noted that other registration techniques, such as aligning myocardia 710 and 20 by aligning best fitting ellipsoids 730 as shown in FIG. 7, do not provide significantly better results.

Alignment problems are mostly caused by operator variability in identifying the long axis and/or the center point, and attempts have been made to overcome this problem by using principal axis orientation (Germano 1995). It can be shown however that alignments based on the principal axes of simple geometric forms fitted to the myocardial surfaces does not guarantee stable center points relative to the organ or a stable anatomical alignment (Slomka 1995).

A method is therefore needed which allows registration of a target image automatically on a template image whose shape and size may be different, though both target and template have similar morphological features. If this template is well oriented, the target image will be well oriented, and any small deviation from the ideal orientation will be constant across all target images. Following the registration, predefined myocardial segments in the template image can be transferred exactly to the target image. As a result, size and shape normalization are obtained without the need for radial sampling, and regional count rate distributions can be compared from case to case.

The present invention is directed to a method for elimination of normal differences in orientation, size and shape by a technique to be termed "elastic image registration." Elastic image registration provides a transformation similar to the "morphing" transformations which are becoming commonly used in the television and film entertainment industry. According to the present invention, a myocardial image is transformed by elastic image registration to substantially overlap a template heart (obtained by the averaging of many normal hearts) so that the differences between the template heart and the transformed image represents important differences in regional blood flow. The morphing transformation of the present invention involves the recognizing of myocardial features (for instance, by the use of an eight-dimensional coordinate system used for distance calculations), centering of the myocardial image, the resizing and changing of the proportions of the myocardial image, and fine shape adjustments.

Myocardial perfusion scintigraphy plays an important role in the diagnosis of patients which are suspected of having a narrowing of the blood vessels in the heart. Although in many cases the symptoms and the findings of a rest/stress comparison can unambiguous, in some cases the diagnosis cannot be made with certainty so a more definitive test, such as a coronary arteriogram, would be required. However, coronary arteriograms are expensive, unpleasant for the patient, and carry some risks for the patient, so a method of increasing the accuracy of diagnosis with myocardial perfusion scintigraphy would be desirable.

The method of the present invention for registration of images from myocardial perfusion scintigraphy can be automated and makes the interpretation of myocardial perfusion scintigraphy images reliable. The method of the present invention, although discussed herein in the context of myocardial imaging, may be applied to the imaging of any other organs or body parts for the purpose of diagnosis.

It is therefore a general object of the present invention to provide an improved method for myocardial imaging.

More particularly, it is an object of the present invention to provide a method for registration of myocardial images for the purpose of diagnosis.

More particularly, it is an object of the present invention to provide a method for registration of myocardial images using an elastic transformation.

An additional object of the present invention is to provide a reliable, operator independent method for the analysis and interpretation of organ images such as myocardial perfusion scintigraphies.

Another object of the present invention is to provide a method for image registration of body parts and internal organs, especially to avoid diagnosis by more invasive techniques.

Further objects and advantages of the present invention will become apparent from a consideration of the drawings and the ensuing detailed description. These various embodiments and their ramifications are addressed in greater detail in the Detailed Description.

SUMMARY OF THE INVENTION

The present invention is directed to a method for registration of a spatial count density image of a first organ with an image of a second organ having a second organ surface. Segmentation of the first organ to provide the first organ surface is accomplished using a spatial derivative of the spatial count density. Registration of the two organ surfaces is then obtained by performing a rigid transformation of the first organ surface so as to minimize a first distance measure between the transformed first surface and the second surface. The transformed first surface is then transformed by a global affine transformation so as to minimize a second distance measure between the transformed first surface and the second surface. Then, the transformed first organ surface is again transformed by a local transformation so as to minimize a third distance measure between the transformed first surface and the second surface.

BRIEF DESCRIPTION OF DRAWINGS

The accompanying drawings, which are incorporated in and form a part of the present specification, illustrate embodiments of the invention and, together with the Detailed Description, serve to explain the principles of the invention:

FIGS. 3A–3D illustrate the sensitivity of bull's eye maps to the location of the origin.

FIGS. 4A–4D illustrate the sensitivity of bull's eye maps to the orientation of the coordinate system.

DETAILED DESCRIPTION

The present invention is directed to a method which decreases the effect of operator variability and morphologically blind sampling in the quantification of scintigraphic myocardial perfusion studies by automatically registering patients' myocardial images using a non-rigid transformation. More particularly, the non-rigid transformation is a combination of a rigid transformation, followed by an affine transformation, and then a number of local splines. Alternatively, the non-rigid transformation is a combination of a rigid transformation, followed by an affine transformation, and then a number of locally affine transformations as described in the Feldmar and Ayache reference.

The method of the present invention first requires that the perfusion scintigraphy image is "segmented" to isolate the myocardium from the surrounding tissue. The registration of the stress image onto the rest image of the stress, and rest image onto a template image, can be performed using a rigid transformation, a global affine transformation and then a local spline transformation. It should be noted that the order of the alignment of stress image, rest image and template may affect the degree of registration between the images. For instance, it may be preferable to align the rest image with the stress image prior to align both of these images with the template. Alternatively, it may be preferable to align the rest image with the template before aligning both of these images with the stress image.

The effectiveness of the method has been tested by determining if the variability in normal cases is reduced, and if abnormal cases remain distinct from normal cases.

To begin the elastic registration method of the present invention, the surface points on the myocardium must be identified by a process termed "segmentation" (Besl 92). According to the segmentation procedure of the present invention, surface points are minima of the first derivative along radii originating approximately at the center of the ventricular cavity. Since pixels in the image are characterized by:

1) the size of the first derivative at that point;
2) the sign of the derivative;
3) the underlying density;
4) the distance from the other points and from the origin;
5) the order of the sign (from center to periphery the order must be positive, negative);
the definition of a point as a surface point may also be calculated based on a combination of these attributes. In addition, during the registration, points at the extremes of the cluster of the distribution of distances between template and target points are disregarded.

A first step of the transformation of the present invention is a rigid transformation "F" to achieve a minimal distance between the target and template surface points. The sign of the derivative is taken into account, as in all the subsequent steps. Mathematically, the transformation of each point M on the target surface S1 to the transformed point M' on the transformed target surface S1' is given by $$M'=R\ M+T \text{ and } S1'=R\ S1+T,$$

where "R" is a rotation and "T" is a translation. After an initial transformation F0, subsequent iterations are performed by: finding the closest point N on the template surface for each point M on the target surface using a method such as the distance map method [Danielsson 1980], and determining the subsequent transformations Fi using a least squares evaluation to superimpose M and N.

The initial rigid transformation F0 is a rough estimate of the rigid transformation required to optimally superimpose the target and template images. For each point N on the template surface S2 the principal curvatures (k1,k2) and the principal frame e1 and e2 are determined and stored in a hash table or a kd-tree. Then a point M is randomly chosen on the target surface S1 and the set of points N' on S2 which have principal curvatures which are approximately the same as that of point M are determined. For each point N' the transformation which superposes M to N' and the principal frames at M and N' is determined, and that transformation which provides the best superposition of S1 and S2 is chosen.

The best superposition of S1'and S2 is determined by picking a subset of points P on S1, and for each point P determining the point Q on S2 closest to P. For each point P which is within a distance $$\delta \|PM\|/D$$

is counted, where D is a diameter of S2. If the number of points P within that distance, divided by the number of points investigated, is greater than a ratio $\rho(0<\rho<1)$ then the transformation is determined to be an adequate initial rigid transformation F0.

Next, a global affine transformation G is performed. The global affine transformation G maps S1' to S1", i.e., $$S1''=G\ S1'=A\ S1'+B,$$

where A is a global affine transformation, i.e. a transformation which scales three orthogonal axes independently to change the size and shape of the myocardium while maintaining the overall morphological features. The matrix B represents an additional rotation and translation, and also incorporates a possible axis shift.

Figure 9A:
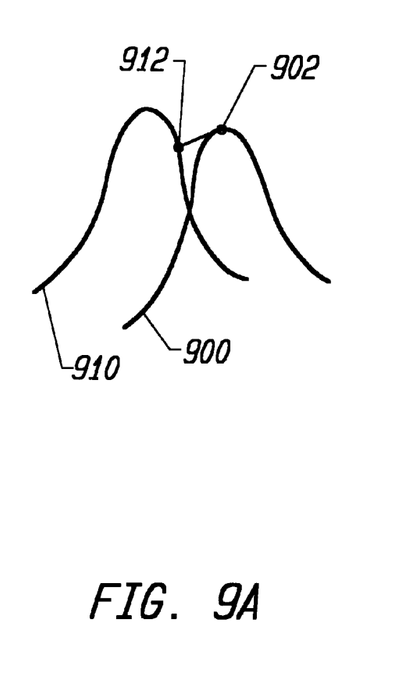
FIG. 9A shows the closest point to a point at the top of the right-hand curve using a standard three-dimensional Euclidean distance measure.
Figure 9B:
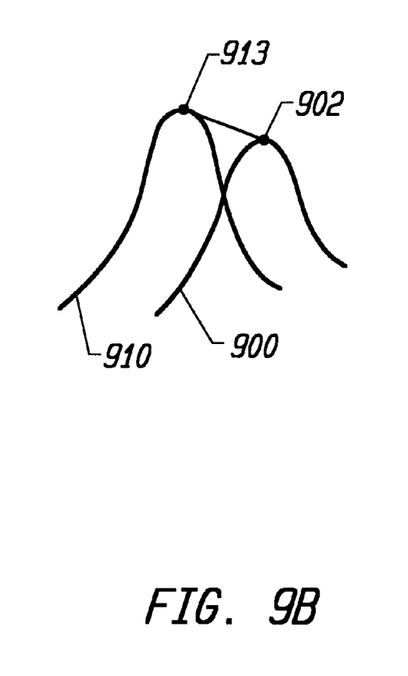
FIG. 9B shows the closest point to a point at the top of the right-hand curve using an eight-dimensional distance measure which includes curvature and normal vector information.

However, since the transformation G which minimizes the distance between S1" and S2 does not have a stable solution (since an optimal transformation G has A=0 and B equal to a point on S2), locally similar points are matched by defining a new distance measure which incorporates curvature information. In particular, the distance measure d between points M" and N is $$d(M, N) = [\alpha 1(x - x'')^2 + \alpha 2(y - y'')^2 +$$
$$\alpha 3(z - z'')^2 + \alpha 4(nx - nx'')^2 + \alpha 5(ny - ny'')^2 + \alpha 6(nz - nz'')^2 +$$
$$\alpha 7(k1 - k1'')^2 + \alpha 8(k2 - k2'')^2]^{\frac{1}{2}},$$

where (nx, ny, nz) is the normal vector of S2 at N, and (nx", ny", nz") is the normal vector of S1" at M". Because this distance measure incorporates orientation and curvature information it often does a much superior job of matching points that the eye would choose to match than the standard three-dimensional Euclidean distance measure. The Euclidean distance measure of nearest points is illustrated in FIG. 9A, where two similarly shaped curves 900 and 910 are shown, and the point on curve 910 closest to the point 902 at the top of curve 900 is shown to be a point 912 on the side of the curve 910. In comparison, according to the eight-dimensional distance measure given above, the closest point on curve 910 to the point 902 at the top of curve 900 is a point 913 very near the top of curve 910.

Finally, local optimization of the distances between points on S1" and S2 is then obtained by local spline deformations, which are restricted by the distance over which the deformation works and by the "energy" required for the spline (Press 1986).

When the functions of the global affine and the local spline have been defined, pixel values in the pre-transformation stress and rest target images are mapped to pixel values in the transformed space by a process termed "resampling." Although in continuous space the relation between an original coordinate (x, y, z) and a transformed coordinate (x", y", z") is one-to-one, in a discreet space the mapping may be one-to-many or many-to-one. Therefore, the resampling can be performed a number of different ways. For instance, if voxel (K, L, M) is mapped to voxels (K1', L1', M1') and (K2',L2',M2') by the transformation, the activity (i.e., the signal or density of counts) in voxel (K, L, M) can either be placed in both voxels (K1', L1', M1') and (K2', L2', M2'), or distributed between (K1', L1', M1') and (K2', L2', M1'). The second approach conserves densities.

Figure 8:
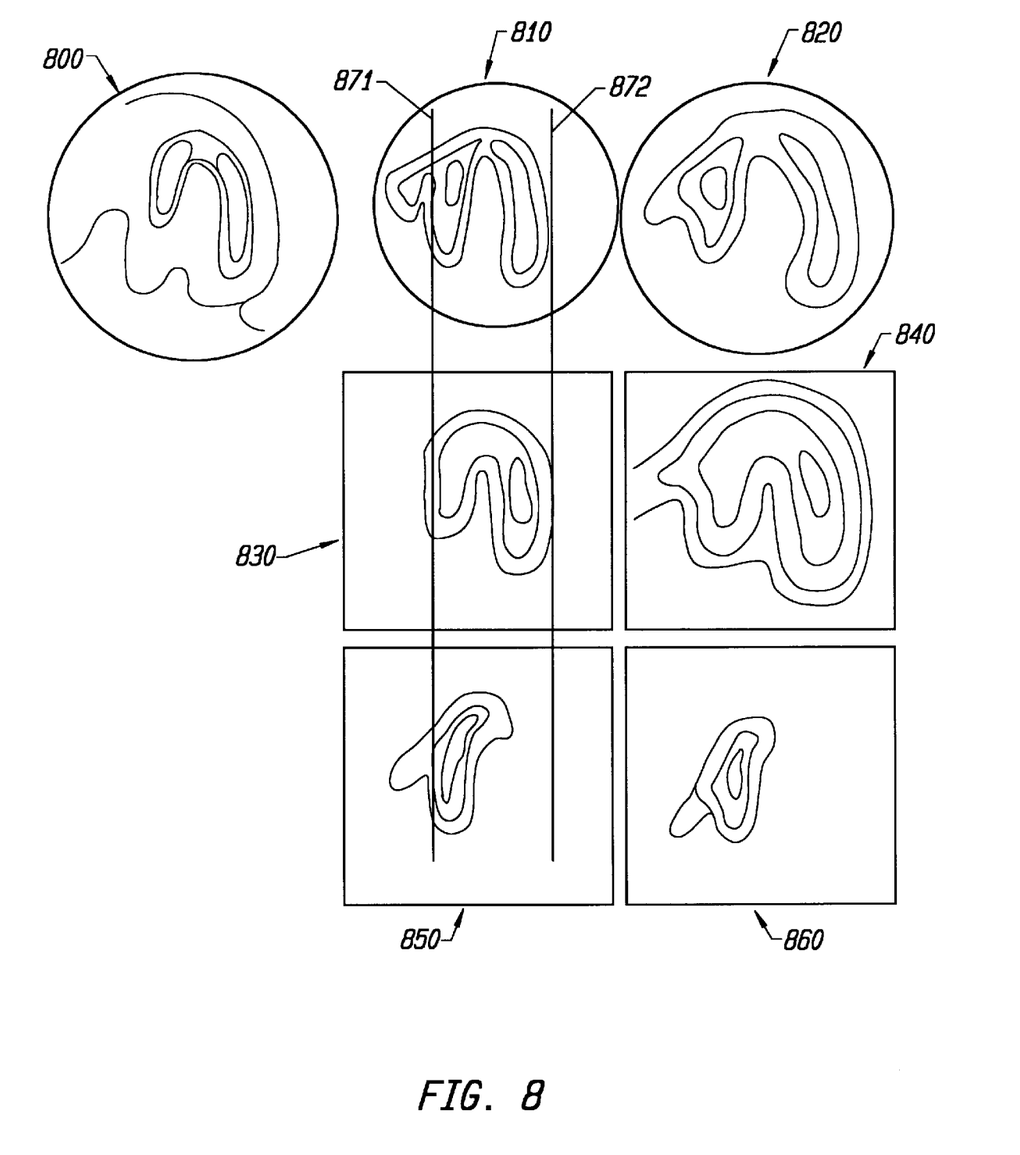
FIG. 8 illustrates the transformation of the present invention for a template and three target cases. The original target cases are in the right-hand column, and the transformed target cases are in the middle column.

The registration method of the present invention is illustrated for a template myocardium and three target myocardia in FIG. 8. The template myocardium 800 is shown in the upper left-hand corner of FIG. 8. Cross-sections of the original target myocardia 820, 840 and 860 are shown as the images in the right-hand column, and the cross-sections of the transformed myocardia 810, 830 and 850 are shown in the middle column of FIG. 8. As illustrated by the two vertical lines 871 and 872 in the middle column, the transformed myocardia each have approximately the same width.

The validation of the effectiveness of the method of the present invention is based on statistically significant improvement in the differentiation of patient groups with four different categories of myocardial perfusion. The four groups are: patients with normal coronary flow; patients with coronary artery disease and no history of infarction; and patients with an history of infarction and no clinical or electrocardiographic signs of ischemia. Patients with normal coronary flow form a group with small deviations from the average normal regional flow distribution. Patients with coronary artery disease, with or without a history of myocardial infarction, differ significantly from the normal average. Patients with coronary artery disease with signs or symptoms of stress ischemia but without infarction show a difference between the resting study and the stress study which is larger than the average difference between stress and rest in the two other groups.

The subjects in the validation study of the present invention were patients referred to the division of Nuclear Medicine at Stanford for a myocardial perfusion rest and stress SPECT. The patients were stratified into a reference group if they have normal coronaries demonstrated by arteriography or their risk of coronary artery disease is less than 15% according to the classification of Diamond and Forrester (Diamond 80). The group with coronary artery disease were patients having a greater than 80% risk of coronary artery disease according to classification of Diamond and Forrester, having a history of Q-wave myocardial infarction, or having a positive coronary arteriogram.

The method was validated by demonstrating by F-testing that after polar sampling the standard deviation around the mean of the normal case stress polar maps is smaller when this registration method is used than if the alignment is concurrently performed by an experienced operator or if the alignment was performed in routine clinical practice prior to the conception of this study. Also, the method has been validated by the reduction of variation between normal myocardial images without a reduction of the difference between normal and abnormal. Finally, it has been shown that a segmental segmentation with an average normal segment value map, increases the separation between normal and abnormal cases.

With expected values for the sensitivity (the percentage of positive test results for patients having a disease) and the specificity (the percentage of negative test results for patients which do not have a disease) of the polar analysis after manual centering and reorientation being about 85%, 100 cases in each category are needed to demonstrate a 3.5% change with a confidence of 0.05, and 200 cases are need to demonstrate a 2.5% with this confidence. However, this assumes that the patients belong with certainty in a given class, and the majority of cases cannot be stratified in that way. An alternative is to use only intermediate classes of patients, and to exploit the necessary relation between the symptom prevalence P(S) and the disease prevalence P(S) given by $$P(S)=a \cdot P(D)+b,$$

where b is the non-specificity and a+b the sensitivity (Diamond 86, Goris 89).

Although the above description contains many specificities, these should not be construed as limiting the scope of the invention, but as merely providing illustrations of some of the preferred embodiments of this invention. Many variations are possible and are to be considered within the scope of the present invention. For instance: the technique can be applied to other organs or body parts; the technique can be applied to parts of the heart other than the left ventricle; the technique can be applied to images other than perfusion scintigraphic images; the optimal rigid transform can be determined using another method; the optimal global affine transform can be determined using another method; the optimal splines or local affine transforms can be determined using other methods; the segmentation can be performed using data in addition to the first derivative; the segmentation can be performed using other combinations of data; the resampling need not conserve the sum of the count densities; etc.

Many other variations are also to be considered within the scope of the present invention. Thus the scope of the invention should be determined not by the examples given herein, but rather by the appended claims and their equivalents.

TABLE 1

| Reference and pt. characteristics | Sensitivity | non-specificity | Interpretation | Validation | Data type |
|---|---|---|---|---|---|
| Tamaki 1984 | 98% | 9% | | 1 | 201Tl(S&D)* |
| Iskandrian 1989 well tested | 88%(164) | 38%(58) | B | 1 | 201Tl(S&D) |
| Iskandrian 1989 Single vessel | 74%(39) | — | B | 1 | 201Tl(S&D) |
| Iskandrian 1989 Two vessel | 88%(69) | — | B | 1 | 201Tl(S&D) |
| Iskandrian 1989 Three vessel | 98%(56) | — | B | 1 | 201Tl(S&D) |
| Iskandrian 1989 Understressed | 73%(108) | — | B | 1 | 201Tl(S&D) |
| Iskandrian 1989 Single vessel | 52%(31) | — | B | 1 | 201Tl(S&D) |
| Iskandrian 1989 Two vessel | 84%(38) | — | B | 1 | 201Tl(S&D) |
| Iskandrian 1989 Three vessel | 79%(39) | — | B | 1 | 201Tl(S&D) |
| Iskandrian 1989 | — | 7% | B | 2 | 201Tl(S&D) |
| DiPasquale 88 | 95% | 29% | S | 1 | 201Tl(S&D)* |
| Goris 1989 Well tested | 92%(135) | 42%(135) | S | 2 | 201Tl(S) |
| Goris 1989 Understressed | 74%(135) | 7%(135) | S | 2 | 201Tl(S) |
| Maddahi 1989 | 96% | 45% | | 1 | 201Tl(S&D)* |
| Maddahi 1989 | — | 14% | | 2 | |
| Tamaki 1989 | 86% | 35% | | | 201Tl(S&D)* |
| Mahmarian 90 | 87%(221) | 19%(41) | B | 1 | 201Tl(S&D) |
| Mahmarian 90 | 95%(171) | 19%(41) | B | 1 | 201Tl(S&D) |
| Mahmarian 90 | 99%(74) | 19%(41) | S | 1 | 201Tl(S&D) |
| Mahmarian 90 | 78%(86) | 19%(41) | S | 1 | 201Tl(S&D) |
| VanTrain 1990 | 94%(111) | 34%(18) | S | 1 | 201Tl(S only) |
| VanTrain 1990 | — | 18%(39) | S | 2 | 201Tl(S only) |
| VanTrain 1990 Single vessel | 83%(24) | 34% | S | 1 | 201Tl(S only) |
| VanTrain 1990 Two vessel | 98%(41) | 34% | S | 1 | 201Tl(S only) |
| VanTrain 1990 Three vessel | 98%(46) | 34% | S | 1 | 201Tl(S only) |
| Go 1990 | 76%(152) | 20%(50) | Tr | 1 | 201Tl(S&D) |
| Stewart 1990 | 84% | 47% | | | 201Tl(S&D)* |
| Tamaki 1994 | 73%(40) | 23%(35) | | 1 | 201Tl(S&D) |
| Tamaki 1994 | 75%(40) | 20%(35) | | 1 | Tetrofosmin(S&R) |
| Van Train 1994 | 89%(102) | 64%(22) | | 1 | Sestamibi(S only) |
| Van Train 1994 | — | 19%(37) | | 2 | Sestamibi(S only) |

1: Standard is coronary arteriogram.
2: Clinical stratification.
S&D is stress injection with early and delayed imaging.
S&R separate stress and rest injection.
R&D Resting injection with early and delayed imaging.
S only: only stress abnormalities are used in diagnosis.
Tr: transient defects only
U: no mention is made of the utilization of the differences between rest and stress image.
B: fixed and transient defects are included.

Literature Cited

Besl P. and NcKay N.: A method for registration of 3D shapes. IEEE Transactions on Pattern Analysis and Machine Intelligence, 14:239–256, 1992.

P. E. Danielsson: Euclidean distance mapping. Computer Graphics and Image Processing, 14:227–248, 1980.

Diamond G A, Forrester J S and Hirsch M: Application of conditional probability analysis to the clinical diagnosis of coronary artery disease. J Clin Invest 1980; 65:1210–1221.

Diamond G A, Forrester J S Hirsch M et al.: A model for assessing the sensitivity and specificity of tests subject to selection bias. J Chron Dis 1986; 39:343–355.

DiPasquale E E, Nody A C, DePuey E G et al.: Quantitative rotational thallium-201 tomography for identifying and localizing coronary artery disease. Circulation 1988; 77:316–327.

Feldmar J, and Ayache N: Rigid, Affine and Locally Affine Registration of Free-Form Surfaces. Programme 4—Robotique, image et vision, Projet Epidaure, Rapport de recherche n °2220—March 1994.

Garcia E, Maddahi J, Berman D and Waxman A: Space/time quantitation of Thallium-201 Myocardial scintigraphy. J Nucl Med 1981; 22:309–317.

Garcia E V, Van Train K V, Maddahi J et al.: Quantification of Rotational Thallium-201 Myocardial tomography. J Nucl Med 1985; 26:17–26.

Germano G, Kavanagh P B, Su H-T et al.: Automatic reorientation of three-dimensional transaxial myocardial perfusion SPECT images. J Nuc Med 1995; 36:1107–1114.

Go R T, Marwick T H, McIntyre W J et al.: A prospective comparison of Rubidium-82 positron emission tomography and Thallium-201 SPECT myocardial perfusion imaging utilizing a single dipyridamole stress in the diagnosis of coronary artery disease. J Nucl Med 1990; 31:1899–1905.

Goris, M. L., J. Sue and M. A. Johnson: A principled approach to the "circumferential" method for Thallium myocardial perfusion scintigraphy quantitation. In: Non-invasive Assessment of the Cardiovascular System: Diagnostic Principles and Techniques. Edward B. Diethrich (ed.), John Wright, P S G, Inc., Boston, Bristol, London, 1982.

Goris, M. L., Bretille, J., Askienazy, S., Purcell, G. P., Savelli, V.: The validation of Diagnostic Procedures on Stratified Populations: Application on the Quantification of Thallium Myocardial Perfusion Scintigraphy. J. Am Physiologic Imaging 1989; 4:11–15.

Goris, M. L., S. Boudier, and P. A. Briandet: Interrogation and display of single photon emission tomography data as inherently volume data. Am J of Physiologic Imaging, 1986; 1:168–180.

Goris, M. L., S. Boudier, and P. A. Briandet: Two-Dimensional mapping of three dimensional SPECT data: A preliminary step to the quantitation of thallium myocardial perfusion single photon emission tomography. Am J of Physiologic Imaging, 1987; 2:176–180.

Goris M L, Maladain G and Marque I: Automatic registration of myocardial perfusion studies using a potential based rigid transformation. 2nd International conference of Nuclear Cardiology April 1995, Cannes, France. J Nucl Cardiology 1995; 2:S81.

Iskandrian A S, Heo J, Kong B et al.: Effect on exercise level on the ability of thallium-201 tomographic imaging in detecting coronary artery disease: analysis of 461 patients. J Am Coll Cardiol 1989; 14:1477–1486.

Maddahi J, Van Train K, Prigent F et al.: Quantitative single photon emission computed Thallium-201 tomography for detection and localization of coronary artery disease: optimization and prospective validation of new technique. J Am Coll Cardiol 1989; 1689–1699.

Mahmarian J J, Boyce T M, Goldberg R K et al.: Quantitative exercise Thallium-201 single photon emission computed tomography for the enhanced diagnosis of ischemic heart disease. J Am Coll Cardiol 1990; 15:318–329.

Press W H, Flannery B P, Teukolsky S A, Vetterling W T: Numerical Recipes—The Art of Scientific Computing. Cambridge University Press, Cambridge 1986.

Slomka P J, Hurwitz G A, Stephenson J and Cradduck T: Automated alignment and sizing of myocardial Stress and Rest scans to three-dimensional normal templates using an image registration algorithm. J Nuc Med 1995; 36:1115–1122.

Stewart R, Schwaiger M, Molina E et al.: Comparison of Rubidium-82 positron emission tomography and Thallium-201 SPECT imaging for detection of coronary artery disease. Am J Cardiol 1991; 67:1303–1310.

Tamaki N, Yonekura Y, Yamashita K et al.: Value of rest-stress myocardial positron tomography using Nitrogen-13 ammonia for the preoperative prediction of reversible asynergy. J Nucl Med 1989; 30:1302–1310.

Tamaki N, Yonekura Y, Mukai T et al.: Stress thallium-201 transaxial emission computed tomography: Quantitative versus qualitative analysis for evaluation of coronary artery disease. J am Coll Cardiol 1984; 4:1213–1221.

Tamaki N, Takahashi N, Kawamoto M et al.: Myocardial tomography using Technetium-99m-Tetrofosmin to evaluate coronary artery disease. J Nucl Med 1994; 35:594–600.

Van Train K, Garcia E, Maddahi J et al.: Improved quantitation of stress/redistribution TL-201 scintigrams and evaluation of normal limits. IEEE 1982, Computers in Cardiology.

Van Train K F, Berman D A, Garcia E V et al.: Quantitative analysis of stress Thallium-201 myocardial scintigrams: A multicenter trial. J Nucl Med 1986; 27:17–25.

Van Train K F, Maddahi J, Berman D S et al.: Quantitative analysis of tomographic stress thallium-201 myocardial scintigrams: a multicenter trial. J Nucl Med 1990; 31:1168–1179.

Van Train K F, Garcia E V, Maddahi J et al.: Multicenter trial validation for qualitative analysis of same-day rest-stress Technetium-99m-Sestamibi myocardial tomograms. J Nucl Med 1994; 35:609–618.

Vogel R A: Quantitative aspects of myocardial perfusion imaging. Seminars in Nucl Med 1980; 10:146–155.

What is claimed is:

1. A method for registration of a first image of a first organ and a second image of a second organ having a second organ surface, comprising the steps of:

obtaining a spatial count density corresponding roughly to a density of said first organ;

using a first-order spatial derivative of said spatial count density to determine a first organ surface;

performing a rigid transformation of said first organ surface to provide a rigidly transformed organ surface so as to substantially minimize a first measure of distance between said rigidly transformed organ surface and said second organ surface;

performing a global affine transformation of said rigidly transformed organ surface to provide an affine transformed organ surface so as to substantially minimize a second measure of distance between said affine transformed organ surface and said second organ surface;

performing a redistribution of said initial spatial count density according to said rigid transformation and said global affine transformation to provide a resulting spatial count density within said affine transformed organ surface where a first sum over space of said initial spatial count density is approximately equal to a second sum over space of said resulting spatial count density.

2. The method of claim 1 wherein minima of said first-order spatial derivative of said spatial count density are used to determine said organ surface.

3. The method of claim 1 wherein said organ surface passes through said minima of said first-order spatial derivative of said spatial count density.

4. A method for registration of a first image of a first organ and a second image of a second organ having a second organ surface, said first organ having a spatial count density corresponding roughly to a density of said first organ, comprising the steps of:

segmentation of said first organ from tissue surrounding said first organ to provide a first organ surface using minima of first-order spatial derivatives of said spatial count density;

performing a rigid transformation of said first organ surface to provide a first rigidly transformed organ surface so as to substantially minimize a first measure of distance between said first rigidly transformed organ surface and said second organ surface; and     performing a global affine transformation of said first rigidly transformed organ surface to provide a first affine transformed organ surface so as to substantially minimize a second measure of distance between said first affine transformed organ surface and said second organ surface.

5. A method for registration of a first image of a first organ and a second image of a second organ having a second organ surface, said first organ having a spatial count density corresponding roughly to a density of said first organ, comprising the steps of:

segmentation of said first organ from tissue surrounding said first organ to provide a first organ surface;

performing a rigid transformation of said first organ surface to provide a first rigidly transformed organ surface so as to substantially minimize a first measure of distance between said first rigidly transformed organ surface and said second organ surface;

performing a global affine transformation of said first rigidly transformed organ surface to provide a first affine transformed organ surface so as to substantially minimize a second measure of distance between said first affine transformed organ surface and said second organ surface, said second distance measure incorporating curvature information from said first rigidly transformed organ surface to match locally similar points of said first rigidly transformed organ surface to said second organ surface; and     performing at least one local transformation of said first affine transformed organ surface using a spline function to provide a modified first affine transformed organ surface so as to substantially minimize a third measure of distance between said modified first affine transformed organ surface and said second organ surface.

6. The method of claim 5 wherein said second and third measures of distance are the same.

7. The method of claim 5 wherein said first and second measures of distance are the same.

* * * * *